United States Patent
Zhou et al.

(10) Patent No.: US 7,090,922 B2
(45) Date of Patent: Aug. 15, 2006

(54) SILICONE PRIMING COMPOSITIONS, ARTICLES, AND METHODS

(75) Inventors: Zhiming Zhou, Woodbury, MN (US); Mieczyslaw H. Mazurek, Roseville, MN (US); Timothy J. Diekmann, Maplewood, MN (US); Anthony M. Kremer, Woodbury, MN (US); Duane A. Lunsford, Stacy, MN (US); Kurt C. Melancon, White Bear Lake, MN (US); Michael L. Tumey, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 323 days.

(21) Appl. No.: 10/025,130

(22) Filed: Dec. 18, 2001

(65) Prior Publication Data

US 2003/0165676 A1 Sep. 4, 2003

(51) Int. Cl.
B32B 9/04 (2006.01)
C08G 77/26 (2006.01)

(52) U.S. Cl. .......................................... 428/447; 528/28
(58) Field of Classification Search ................. 528/28; 428/447
See application file for complete search history.

(56) References Cited

U.S. PATENT DOCUMENTS

| | | | |
|---|---|---|---|
| 2,676,182 A | 4/1954 | Daudt et al. | |
| 2,736,721 A | 2/1956 | Dexter | |
| 3,627,851 A | 12/1971 | Brady | |
| 3,772,247 A | 11/1973 | Flannigan | |
| 3,890,269 A | 6/1975 | Martin | |
| 3,929,704 A | 12/1975 | Horning | |
| 4,309,520 A | 1/1982 | Blizzard | |
| 4,415,615 A | 11/1983 | Esmay et al. | |
| 4,584,355 A | 4/1986 | Blizzard et al. | |
| 4,661,577 A | 4/1987 | Jo Lane et al. | |
| 4,749,590 A | 6/1988 | Klingen et al. | |
| 4,882,377 A | 11/1989 | Sweet et al. | |
| 4,900,474 A | 2/1990 | Terae et al. | |
| 4,935,484 A | 6/1990 | Wolfgruber et al. | |
| 5,001,012 A | 3/1991 | Sarkar et al. | |
| 5,024,880 A | 6/1991 | Veasley et al. | |
| 5,026,890 A | 6/1991 | Webb et al. | |
| 5,028,679 A | 7/1991 | Terae et al. | |
| 5,045,391 A | 9/1991 | Brandt et al. | |
| 5,082,706 A | 1/1992 | Tangney | |
| 5,106,951 A * | 4/1992 | Morgan et al. | 530/391.9 |
| 5,110,882 A | 5/1992 | Hamada et al. | |
| 5,110,890 A | 5/1992 | Butler | |
| 5,118,775 A | 6/1992 | Inomata et al. | |
| 5,190,827 A | 3/1993 | Lin | |
| 5,214,119 A | 5/1993 | Leir et al. | |
| 5,236,997 A | 8/1993 | Fujiki | |
| 5,248,716 A | 9/1993 | Lin et al. | |
| 5,248,739 A | 9/1993 | Schmidt et al. | |
| 5,276,122 A | 1/1994 | Aoki et al. | |
| 5,290,615 A | 3/1994 | Tushaus et al. | |
| 5,302,685 A | 4/1994 | Tsumura et al. | |
| 5,319,040 A | 6/1994 | Wengrovius et al. | |
| 5,352,527 A | 10/1994 | Harada et al. | |
| 5,461,134 A | 10/1995 | Leir et al. | |
| 5,475,124 A | 12/1995 | Mazurek et al. | |
| 5,512,650 A | 4/1996 | Leir et al. | |
| 5,576,110 A | 11/1996 | Lin et al. | |
| 5,602,214 A | 2/1997 | Lin et al. | |
| 5,643,581 A * | 7/1997 | Mougin et al. | 424/401 |
| 5,741,876 A | 4/1998 | Carpenter, II et al. | |
| 5,776,614 A | 7/1998 | Cifuentes et al. | |
| 5,804,610 A | 9/1998 | Hamer et al. | |
| 5,916,981 A | 6/1999 | Cifuentes et al. | |
| 5,932,321 A | 8/1999 | Eisele et al. | |
| 6,007,914 A | 12/1999 | Joseph et al. | |
| 6,103,152 A | 8/2000 | Gehlsen et al. | |
| 6,365,697 B1 * | 4/2002 | Kim et al. | 528/28 |
| 6,613,859 B1 * | 9/2003 | Shores | 528/28 |
| 6,664,359 B1 * | 12/2003 | Kangas et al. | 528/38 |

FOREIGN PATENT DOCUMENTS

| | | |
|---|---|---|
| EP | 0 380 236 B1 | 8/1990 |
| EP | 380 236 * | 8/1990 |
| EP | 0 867 493 A2 | 9/1998 |
| EP | 0 867 493 A3 | 9/1998 |
| JP | 2-36234 | 2/1990 |
| JP | 2135210 | 5/1990 |
| JP | 2296832 | 12/1990 |
| WO | WO 96/30426 A1 | 10/1996 |
| WO | WO 96/34028 A1 | 10/1996 |
| WO | WO 96/34029 A1 | 10/1996 |
| WO | WO 96/34030 A1 | 10/1996 |
| WO | WO 96/35458 A2 | 11/1996 |
| WO | WO 96/35458 A3 | 11/1996 |
| WO | WO 97/40103 A1 | 10/1997 |

(Continued)

OTHER PUBLICATIONS

American Society for Testing and Materials, "ASTM D-3654-88, Standard Test Method for Holding Power of Pressure-Sensitive Tapes," *Annual Book of ASTM Standards*, pp. 545-548 (1988).
American Society for Testing and Materials, "ASTM D-3330-90, Standard Test Methods for Peel Adhesion of Pressure-Sensitive Tape at 180° Angle," *Annual Book of ASTM Standards*, pp. 485-488 (1990).

(Continued)

*Primary Examiner*—Margaret G. Moore
(74) *Attorney, Agent, or Firm*—Jean A. Lown; Lisa P. Fulton; Ann M. Mueting

(57) ABSTRACT

Priming compositions and methods, wherein the compositions include a polydiorganosiloxane polyurea copolymer comprising electron rich groups.

22 Claims, No Drawings

FOREIGN PATENT DOCUMENTS

| WO | WO 98/15602 A1 | 4/1998 |
| WO | WO 98/17726 A1 | 4/1998 |
| WO | 00/75210 | * 12/2000 |
| WO | WO 00/75210 | 12/2000 |

OTHER PUBLICATIONS

American Society for Testing and Materials, "ASTM D-2979-95, Standard Test Method for Pressure-Sensitive Tack of Adhesives Using an Inverted Probe Machine," *Annual Book of ASTM Standards*, pp. 183-185 (1995).

*Encyclopedia of Polymer Science and Engineering*, vol. 15, John Wiley & Sons, New York, 1989, pp. 265-270.

Tyagi et al., "Segmented organosiloxane copolymers: 2. Thermal and mechanical Properties of siloxane-urea copolymers," *Polymer*, 25(12):1807-1816 (Dec. 1984).

U.S. Appl. No. 09/612,341, filed Jul. 6, 2000, Sheridan et al.

U.S. Appl. No. 10/027,587, filed Dec. 18, 2001, Melancon et al.

U.S. Appl. No. 10/028,553, filed Dec. 18, 2001, Sherman et al.

Patent Abstracts of Japan, vol. 099, No. 074, Apr. 3, 1985 & JP 59 209608, Nov. 28, 1984, Abstract.

* cited by examiner

SILICONE PRIMING COMPOSITIONS, ARTICLES, AND METHODS

FIELD OF THE INVENTION

The invention relates to silicone priming compositions, particularly adhesives, more particularly pressure sensitive adhesives, articles, and methods of making and using. The adhesives are particularly useful on articles such as tapes, particularly foam tapes, for example.

BACKGROUND

Pressure sensitive adhesives containing polydiorganosiloxane polyurea copolymers and a compatible tackifier are well known. They have a variety of applications because they can possess one or more of the following properties: high thermal stability; high oxidative stability; permeability to many gases; low surface energy; low index of refraction; low hydrophilicity; dielectric properties; biocompatibility; and adhesive properties. Examples of such pressure sensitive adhesives are disclosed in U.S. Pat. No. 5,461,134 (Leir et al.), U.S. Pat. No. 5,512,650 (Leir et al.), U.S. Pat. No. 5,475,124 (Mazurek et al.), as well as International Publication Nos. WO 96/30426 (3M Co., St. Paul, Minn.), WO 96/34028 (3M Co.), WO 96/34029 (3M Co.), and WO 98/15602 (3M Co.).

Silicone pressure sensitive adhesives, however, do not typically adhere well to backings such as foam cores or films. The typical challenge faced is that adhesive performance between the adhesive and such backings is generally unsatisfactory.

Thus, what is still needed are adhesives and adhesive articles, particularly tapes such as foam tapes, having adequate adhesion between the adhesive and backing and that provide an effective peel strength and shear strength to a wide variety of materials.

SUMMARY OF THE INVENTION

The present invention provides priming compositions, articles, and methods. These compositions can be in the form of primers, adhesives, or other coatings and surface treatments. The priming compositions are preferably adhesives, and more preferably, pressure sensitive adhesives (PSAs). Preferably, the articles are in the form of tapes, such as foam tapes, for example.

The compositions include a polydiorganosiloxane polyurea copolymer having electron rich groups (i.e., Lewis basic groups) such as tertiary amine (including aliphatic, cycloaliphatic (e.g., piperazine), and aromatic tertiary amines) and pyridine groups. Significantly, these electron rich groups of the polydiorganosiloxane polyurea copolymer provide the self-priming capability. Thus, there is no need for a secondary primer to adhere the compositions of the present invention, particularly adhesives to certain substrates, particularly substrates containing electron poor groups such as acid-functional groups (e.g., carboxylic acid, sulfuric acid, and phosphoric acid groups).

Generally, the priming compositions of the present invention include a polydiorganosiloxane polyurea copolymer that includes electron rich groups (preferably, tertiary amine groups). Preferably, if the priming composition is a self-priming pressure sensitive adhesive it includes a silicone tackifying resin.

In one embodiment, the present invention provides a substantially solvent-free priming composition that includes a polydiorganosiloxane polyurea copolymer having electron rich groups, preferably, tertiary amine groups. Preferably, the priming composition further includes a silicone tackifying resin. The priming composition can be a self-priming adhesive, preferably a pressure sensitive adhesive, or a primer per se. The priming compositions of the present invention are particularly well suited for substrates that include acid functional groups.

In another embodiment, the present invention provides a substantially solvent-free priming composition that includes a polydiorganosiloxane polyurea copolymer including electron rich groups selected from the group consisting of tertiary amine groups, pyridine groups, and combinations thereof.

In yet another embodiment, there is provided a pressure sensitive adhesive that includes a polydiorganosiloxane polyurea copolymer having electron rich groups and a silicone tackifying resin. Preferably, the electron rich groups are selected from the group consisting of tertiary amine groups, pyridine groups, and combinations thereof.

Methods of making and using such compositions are also provided. A method of making includes: reacting a polyfunctional chain extender (preferably, an organic polyamine) including electron rich groups with a polyisocyanate and a polydiorganosiloxane polyamine to form a polydiorganosiloxane polyurea copolymer; and preferably combining the polydiorganosiloxane polyurea with a silicone tackifying resin. A method of using includes applying a priming composition that includes a polydiorganosiloxane polyurea copolymer having electron rich groups.

In another embodiment, the present invention provides an article, preferably an adhesive article, that includes a substrate having disposed on at least one major surface a silicone-based priming composition (such as a pressure sensitive adhesive) as described herein. Adhesive articles include tapes, labels, and other sheeting useful in various formats including but not limited to medical, graphics, signage, damping, and analytical applications. The articles of the present invention can also include primed surfaces, wherein the primer is a silicone-based priming composition as described herein.

DETAILED DESCRIPTION OF PREFERRED EMBODIMENTS

The present invention provides silicone-based priming compositions. These can be in the form of primers, adhesives, or other coatings and surface treatments. In one embodiment, the compositions are self-priming pressure sensitive adhesives. In another embodiment, the compositions are primers. For certain embodiments, the priming compositions are substantially solvent-free (i.e., less than about 1 wt-% organic solvent and/or water).

The priming compositions include at least one polydiorganosiloxane polyurea copolymer having electron rich groups (e.g., tertiary amine groups). Optionally, particularly for the pressure sensitive adhesives, at least one silicone tackifying resin is also included. Significantly, the electron rich groups (e.g., tertiary amine groups) of the polydiorganosiloxane polyurea copolymer provide the priming characteristics to the composition. Thus, particularly for the self-priming pressure sensitive adhesives, there is no need for a secondary primer, particularly when the composition is disposed on a substrate (e.g., backing) containing electron poor groups such as acid-functional groups.

An article (e.g., adhesive tape or primed surface) of the present invention includes a silicone-based priming composition, preferably a self-priming pressure sensitive adhesive. The pressure sensitive adhesive is typically disposed on a backing, which may be permanent or temporary, as with a release liner. Other embodiments of the composition may be coated on a substrate such as polymer films, wood, glass, metals, etc. Also, certain embodiments are laminate constructions with the priming composition disposed on or under various other coatings (e.g., adhesives such as silicone adhesives). If the substrate includes electron poor groups, such as acid functional groups (e.g., carboxylic acid, phosphoric acid, and sulfuric acid groups), the priming composition is particularly effective. That is, for such substrates, no secondary primer is needed.

Substrates on which the priming compositions can be disposed are any of a wide variety as discussed above. The substrate can be made of a transparent material, or it can be translucent or opaque, for example. Particularly preferred substrates are films or foam core backings. Examples of such film backings include poly(ethylene/acrylic acid), poly(ethylene/methacrylic acid), poly(ethylene/vinyl acetate) such as those available under the trade designation BYNELL from DuPont. Examples of foam core backings include acrylic foams, polyurethane foams, poly(ethylene/vinyl acetate) foams, and the like.

As used herein, a pressure sensitive adhesive possesses a balance of the following properties: (1) tack; (2) adherence with no more than finger pressure; (3) sufficient ability to hold onto an adherend; and (4) sufficient cohesive strength. Materials that have been found to function well as PSAs are polymers designed and formulated to exhibit the requisite viscoelastic properties resulting in a desired balance of tack, peel adhesion, and shear holding power.

The electron rich groups of the polymers of the present invention improves adhesion of the polymers to a variety of substrates. Typically, this means that peel adhesion is not adversely affected, whereas shear values are generally improved. Significantly, the incorporation of polar groups (e.g., electron rich tertiary amine groups) does not adversely affect adhesion of the compositions of the present invention to nonpolar substrates such as polypropylene. See, for example, the data presented in Tables 2 and 3 in the Examples Section. Also, for foam cores, the failure mode is generally changed from failure at the interface between the foam core and the composition of the present invention to that of within the foam core.

Polydiorganosiloxane Polyurea Copolymers

Herein, copolymer refers to polymers containing two or more different monomers, including terpolymers, tetrapolymers, etc. Preferred polydiorganosiloxane polyurea copolymers suitable for use in the preparation of priming compositions (preferably, adhesives) according to the present invention are the reaction products of at least one polyamine, wherein the polyamine includes at least one polydiorganosiloxane polyamine (preferably, diamine) with at least one polyisocyanate, and an optional polyfunctional chain extender such as an organic amine and/or alcohol, at least some of which include one or more electron rich groups. The mole ratio of isocyanate to amine is preferably in a range of about 0.9:1 to about 1.1:1, more preferably about 0.95:1 to about 1.05:1, and most preferably about 0.97:1 to about 1.03:1. That is, preferred polydiorganosiloxane polyurea copolymers suitable for use in the preparation of compositions, particularly pressure sensitive adhesives, according to the present invention have polydiorganosiloxane units, polyisocyanate residue units, and optionally, organic polyamine and/or polyol residue units. The polyisocyanate residue units and the polyamine residue units preferably form less than 50% by weight of the polydiorganosiloxane polyurea copolymer. The polyisocyanate residue is the polyisocyanate minus the —NCO groups and the polyamine residue is the polyamine minus the —NH$_2$ groups. The polyisocyanate residue is connected to the polyamine residue by urea linkages. The polyisocyanate residue is connected to the polyol residue by urethane linkages. Examples of such segmented copolymers are disclosed in U.S. Pat. No. 5,461,134 (Leir et al.) and International Publication Nos. WO 96/34029, WO 96/35458, and WO 98/17726, all to the 3M Co., St. Paul, Minn. As used herein, the term polydiorganosiloxane polyurea encompasses materials having the repeating unit of Formula I.

Preferably, the polydiorganosiloxane polyurea copolymers used in preparing the compositions, preferably, adhesives, and more preferably, pressure sensitive adhesives, of the present invention can be represented by the repeating unit (Formula I):

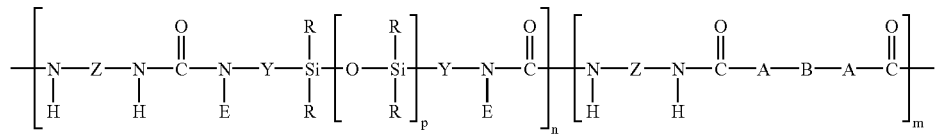

where:

each R is independently an alkyl moiety (preferably having 1 to 12 carbon atoms and may be substituted with, for example, trifluoroalkyl or vinyl groups), a vinyl moiety or higher alkenyl moiety (preferably represented by the formula —R$^2$(CH$_2$)$_a$CH═CH$_2$ wherein R$^2$ is —(CH$_2$)$_b$— or —(CH$_2$)$_c$CH═CH— and a is 1, 2, or 3, b is 0, 3, or 6, and c is 3, 4, or 5), a cycloalkyl moiety (preferably having 6 to 12 carbon atoms and may be substituted with, for example, alkyl, fluoroalkyl, or vinyl groups), or an aryl moiety (preferably having 6 to 20 carbon atoms and may be substituted with, for example, alkyl, cycloalkyl, fluoroalkyl or vinyl groups), or R is a fluorine-containing group (including those described in U.S. Pat. No. 5,236,997 (Fijiki), perfluoroalkyl groups as described in U.S. Pat. No. 5,028,679 (Terae et al.), or perfluoroether-containing groups, as described in U.S. Pat. No. 4,900,474 (Terae et al.) and U.S. Pat. No. 5,118,775 (Inomata et al.)); preferably at least 50% of the R moieties are methyl moieties with the balance being monovalent alkyl or substituted alkyl moieties having 1 to 12 carbon atoms, alkenylene moieties, phenyl moieties, or substituted phenyl moieties;

each Z is independently a polyvalent moiety that is an arylene moiety, an aralkylene moiety, an alkylene moiety, or a cycloalkylene moiety (each of which preferably has 6 to 20 carbon atoms); preferably Z is 2,6-tolylene, 4,4'-methylenediphenylene, 3,3'-dimethoxy-4,4'-biphenylene, tetramethylm-xylylene, 4,4'-methylenedicyclohexylene, 3,5,5-trimethyl-3-methylenecyclohexylene, 1,6-hexamethylene, 1,4-cyclohexylene, 2,2,4-trimethylhexylene, and mixtures thereof;

each Y is independently a polyvalent moiety that independently is an alkylene moiety (preferably having 1 to 10 carbon atoms), an aralkylene moiety or an arylene moiety (each of which preferably has 6 to 20 carbon atoms);

each E is independently hydrogen, an alkyl moiety of 1 to 10 carbon atoms, phenyl, or a moiety that completes a ring structure including Y to form a heterocycle;

each A is independently oxygen or —N(G)-, wherein each G is independently hydrogen, an alkyl moiety of 1 to 10 carbon atoms, phenyl, or a moiety that completes a ring structure including B to form a heterocycle;

B is an alkylene, aralkylene, cycloalkylene, phenylene, polyalkylene, polyalkylene oxide (including for example, polyethylene oxide, polypropylene oxide, polytetramethylene oxide, polycaprolactone, polyethylene adipate), copolymers, or mixtures thereof, or a moiety completing a ring structure including A to form a heterocycle; with the proviso that at least one B group includes an electron rich group (e.g., a tertiary amine or a pyridine group);

m is a number that is 1 to about 1000, preferably 1 to about 25;

n is a number that is equal to or greater than 1 (preferably, n is greater than 8); and p is a number that is about 5 or larger, preferably, about 5 to about 2000, more preferably, about 40 to about 1500, and most preferably about 150 to about 1500.

In the use of polyisocyanates when Z is a moiety having a functionality greater than 2 and/or polyamines when B is a moiety having a functionality greater than 2, the structure of Formula I will be modified to reflect branching at the polymer backbone.

Reactive Components of the Polydiorganosiloxane Polyurea Copolymers

Different isocyanates in the reaction will modify the properties of the polydiorganosiloxane polyurea copolymers in varying ways. Diisocyanates useful in the process of the present invention can be represented by the following (Formula II):

OCN—Z—NCO

Any diisocyanate that can react with a polyamine, and in particular with polydiorganosiloxane diamine of Formula III, below, can be used in the present invention. Examples of such diisocyanates include, but are not limited to, aromatic diisocyanates, such as 2,6-toluene diisocyanate, 2,5-toluene diisocyanate, 2,4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3',5,5'-tetraethyl) diphenylmethane, 4,4'-diisocyanato-3,3'-dimethoxybiphenyl (o-dianisidine diisocyanate), 5-chloro-2,4-toluene diisocyanate, 1-chloromethyl-2,4-diisocyanato benzene, aromatic-aliphatic diisocyanates such as m-xylylene diisocyanate, tetramethyl-m-xylylene diisocyanate, aliphatic diisocyanates, such as 1,4-diisocyanatobutane, 1,6-diisocyanatohexane, 1,12-diisocyanatododecane, 2-methyl-1,5-diisocyanatopentane, and cycloaliphatic diisocyanates such as methylenedicyclohexylene-4,4'-diisocyanate, 3-isocyanatomethyl-3,5,5-trimethylcyclohexyl isocyanate (isophorone diisocyanate), 2,2,4-trimethylhexyl diisocyanate, and cyclohexylene-1,4-diisocyanate and mixtures thereof.

Preferred diisocyanates include 2,6-toluene diisocyanate, methylenediphenylene-4,4'-diisocyanate, polycarbodiimide-modified methylenediphenyl diisocyanate, 4,4'-diisocyanato-3,3'-dimethoxybiphenyl(o-dianisidine diisocyanate), tetramethyl-m-xylylene diisocyanate, methylenedicyclohexylene-4,4'-diisocyanate, 3-isocyanatomethyl-3,5,5-trimethylcyclohexyl isocyanate (isophorone diisocyanate), 1,6-diisocyanatohexane, 2,2,4-trimethylhexyl diisocyanate, and cyclohexylene-1,4-diisocyanate.

Polydiorganosiloxane polyamines useful in the process of the present invention are preferably diamines, which can be represented by the following (Formula III):

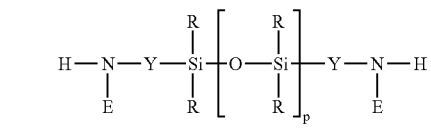

wherein each of R, Y, E, and p are defined as above. Generally, the number average molecular weight of the polydiorganosiloxane polyamines useful in the present invention is greater than about 700.

Preferred polydiorganosiloxane diamines (also referred to as silicone diamines) useful in the present invention are any which fall within Formula III above and including those having number average molecular weights in the range of about 5000 to about 150,000 for pressure sensitive adhesives. Preferably, for primers the molecular weight is at least about 1500, and more preferably, no greater than about 20,000. Polydiorganosiloxane diamines are disclosed, for example, in U.S. Pat. No. 3,890,269 (Martin), U.S. Pat. No. 4,661,577 (JoLane et al.), U.S. Pat. No. 5,026,890 (Webb et al.), U.S. Pat. No. 5,214,119 (Leir et al.), U.S. Pat. No. 5,276,122 (Aoki et al.), U.S. Pat. No. 5,461,134 (Leir et al.), and U.S. Pat. No. 5,512,650 (Leir et al.).

Polydiorganosiloxane polyamines are commercially available from, for example, Shin-Etsu Silicones of America, Inc., Akron, Ohio, and Hüls America, Inc., Pitscataway, N.J. Preferred are substantially pure polydiorganosiloxane diamines prepared as disclosed in U.S. Pat. No. 5,214,119 (Leir et al.). The polydiorganosiloxane diamines having such high purity are prepared from the reaction of cyclic organosilanes and bis(aminoalkyl)disiloxanes utilizing an anhydrous amino alkyl functional silanolate catalyst such as tetramethylammonium-3-aminopropyldimethyl silanolate, preferably in an amount less than 0.15 weight percent based on the weight of the total amount of cyclic organosiloxane with the reaction run in two stages. Particularly preferred polydiorganosiloxane diamines are prepared using cesium and rubidium catalysts and are disclosed in U.S. Pat. No. 5,512,650 (Leir et al.).

Examples of polydiorganosiloxane polyamines useful in the present invention include, but are not limited to, polydimethylsiloxane diamine, polydiphenylsiloxane diamine, polytrifluoropropylmethylsiloxane diamine, polyphenylmethylsiloxane diamine, polydiethylsiloxane diamine, polydivinylsiloxane diamine, polyvinylmethylsiloxane diamine, poly(5-hexenyl)methylsiloxane diamine, and copolymers and mixtures thereof.

The polydiorganosiloxane polyamine component employed to prepare polydiorganosiloxane polyurea segmented copolymers of this invention provides a means of adjusting the modulus of elasticity of the resultant copolymer. In general, high molecular weight polydiorganosiloxane polyamines provide copolymers of lower modulus, whereas low molecular weight polydiorganosiloxane polyamines provide polydiorganosiloxane polyurea segmented copolymers of higher modulus.

When polydiorganosiloxane polyurea segmented copolymer compositions contain an optional organic polyamine, this optional component provides yet another means of modifying the modulus of elasticity of copolymers of this invention. The concentration of organic polyamine as well as the type and molecular weight of the organic polyamine determine how it influences the modulus of polydiorganosiloxane polyurea segmented copolymers containing this component.

Examples of organic polyamines useful in the present invention include, but are not limited to, polyoxyalkylene diamine (such as D-230, D-400, D-2000, D-4000, DU-700, ED-2001 and EDR-148 all available from Huntsman Chemical Corp., Salt Lake City, Utah), polyoxyalkylene triamine (such as T-3000 and T-5000, both available from Huntsman), polyalkylene diamines (such as DYTEK A and DYTEK EP both available from DuPont, Wilmington, Del.), 1,4-bis(3-aminopropyl)piperazine and 3,3'-diamino-N-methyl-dipropylamine (both available from Aldrich Chemical Co., Milwaukee, Wis.), and mixtures thereof.

Preferably, the reactive component that provides the electron rich groups is the organic polyamine (preferably, diamine). Examples of organic polyamines that include electron rich groups are 1,4-bis(3-aminopropyl)piperazine and 3,3'-diamino-N-methyl-dipropylamine, both of which are available from Aldrich Chemical Co., Milwaukee, Wis. Mixtures of such polyamines can be used with each other or with the organic polyamines discussed above.

Preferably, the organic polyamine (or other polyfunctional chain extender) with electron rich groups is used in an amount of at least about 0.01 percent by weight (wt-%), more preferably, at least about 0.1 wt-%, and most preferably, at least about 0.4 wt-%, based on the total weight of the components used to prepare the polydiorganosiloxane polyurea copolymer. Preferably, the organic polyamine (or other polyfunctional chain extender) with electron rich groups is used in an amount of no greater than about 30 wt-%, more preferably, no greater than about 20 wt-%, and most preferably, no greater than about 15 wt-%, based on the total weight of the components used to prepare the polydiorganosiloxane polyurea copolymer.

The nature of the isocyanate residue in the polydiorganosiloxane polyurea copolymer influences stiffness and flow properties, and also affects the properties of the mixtures. Isocyanate residues resulting from diisocyanates that form crystallizable ureas, such as tetramethyl-m-xylylene diisocyanate, 1,12-dodecane diisocyanate, and dianisidine diisocyanate, provide mixtures that can be stiffer, if sufficient polydiorganosiloxane polyurea copolymer is used, than those prepared from methylenedicyclohexylene-4,4'-diisocyanate, 3-isocyanatomethyl-3,5,5-trimethylcyclohexyl isocyanate, and m-xylylene diisocyanate.

Crosslinking agents, if desired may be used, for example Si—H-containing agents may be used to crosslink curable polydiorganosiloxane polyurea copolymers or photoinitiators can be used for free-radically curable polydiorganosiloxane urea copolymers. Additional curatives may also be present such as hydrosilation curatives, peroxide curatives, and photocuratives, such as triazines. When used, the amounts of such components are those that are suitable for the purpose intended and are typically used at a concentration of from about 0.1% to about 5% by weight of the total weight of the polymerizable composition. Crosslinking can also be carried out using electron beam radiation if desired.

Preparation of the Polydiorganosiloxane Polyurea Copolymers

The polydiorganosiloxane polyurea copolymers can be made by any of a variety of known methods, including solvent-based and solvent-free methods. Examples of solvent-based processes include Tyagi et al., "Segmented Organosiloxane Copolymers: 2. Thermal and Mechanical Properties of Siloxane urea Copolymers," *Polymer*, Vol. 25, December, 1984 and U.S. Pat. No. 5,214,119 (Leir et al.). Suitable solvents are organic solvents that are unreactive with the polyisocyanates and that maintain the reactants and products completely in solution throughout the polymerization reaction. Typical organic solvents include those that have a combination of polar and nonpolar character, or mixtures of polar solvents with nonpolar solvents can be used. Preferred organic solvents include polar aprotic solvents, chlorinated solvents, ethers, aromatic hydrocarbons, aliphatic hydrocarbons, and alcohols. Examples include heptane, toluene, xylene, methyl ethyl ketone, 2-propanol, tert-butanol, tetrahydrofuran, isoamyl alcohol, chloroform, dichloromethane, dimethyl formamide, and the like, and combinations thereof. Examples of solvent-free processes include International Publication Nos. WO 96/34029, WO 96/35458, and WO 98/17726, all to the 3M Co., St. Paul, Minn.

Silicone Tackifying Resins

Silicone tackifying resins are preferably added to the polydiorganosiloxane polyurea copolymer to provide or enhance the pressure sensitive adhesive properties of the polymer for the self-priming pressure sensitive adhesives of the present invention. Preferably primers of the present invention do not include silicone tackifying resins. The silicone tackifying resin can play an important role in determining the physical properties of the polydiorganosiloxane polyurea copolymer of the present invention. For example, as silicone tackifying resin content is increased from low to high concentration, the glassy to rubbery transition of the polydiorganosiloxane polyurea copolymer occurs at increasingly higher temperatures. One need not be limited to a single silicone tackifying resin as it may be beneficial to employ a combination of resins in a single composition to achieve desired performance.

The silicone tackifying resins useful in the present invention include those resins composed of the following structural units M ($R'_3SiO_{1/2}$ units), D ($R'_2SiO_{2/2}$ units), T ($R'SiO_{3/2}$ units), and Q ($SiO_{4/2}$ units), and combinations thereof. Typical examples include MQ silicone tackifying resins, MQD silicone tackifying resins, and MQT silicone tackifying resins. These preferably have a number average molecular weight of about 100 to about 50,000, more preferably about 500 to about 15,000 and generally have methyl substituents.

MQ silicone tackifying resins are copolymeric silicone resins having $R'_3SiO_{1/2}$ units ("M" units) and $SiO_{4/2}$ units ("Q"units), where the M units are bonded to the Q units, each of which is bonded to at least one other Q unit. Some of the $SiO_{4/2}$ units ("Q"units) are bonded to hydroxyl radicals resulting in $HOSiO_{3/2}$ units ("$T^{OH}$" units), thereby accounting for the silicon-bonded hydroxyl content of the silicone tackifying resin, and some are bonded only to other $SiO_{4/2}$ units.

Such resins are described in, for example, *Encyclopedia of Polymer Science and Engineering*, vol. 15, John Wiley & Sons, New York, (1989), pp. 265–270, and U.S. Pat. No.

2,676,182 (Daudt et al.), U.S. Pat. No. 3,627,851 (Brady), U.S. Pat. No. 3,772,247 (Flannigan), and U.S. Pat. No. 5,248,739 (Schmidt et al.). Other examples are disclosed in U.S. Pat. No. 5,082,706 (Tangney). The above-described resins are generally prepared in solvent. Dried or solventless, MQ silicone tackifying resins can be prepared, as described in U.S. Pat. No. 5,319,040 (Wengrovius et al.), U.S. Pat. No. 5,302,685 (Tsumura et al.), and U.S. Pat. No. 4,935,484 (Wolfgruber et al.).

Certain MQ silicone tackifying resins can be prepared by the silica hydrosol capping process described in U.S. Pat. No. 2,676,182 (Daudt et al.) as modified according to U.S. Pat. No. 3,627,851 (Brady), and U.S. Pat. No. 3,772,247 (Flannigan). The modified process of Daudt et al. includes limiting the concentration of the sodium silicate solution, and/or the silicon-to-sodium ratio in the sodium silicate, and/or the time before capping the neutralized sodium silicate solution to generally lower values than those disclosed by Daudt et al. The neutralized silica hydrosol is preferably stabilized with an alcohol, such as 2-propanol, and capped with $R_3SiO_{1/2}$ siloxane units as soon as possible after being neutralized. It is important to note that the level of silicon bonded hydroxyl groups on the MQ resin may be reduced, preferably to less than about 1.5% by weight, more preferably to no greater than about 1.2 wt-%, even more preferably to no greater than about 1.0 wt-%, and most preferably to no greater than 0.8 wt-%. This may be accomplished, for example, by reacting hexamethyldisilazane with the silicone tackifying resin. Such a reaction may be catalyzed, for example, with trifluoroacetic acid. Alternatively, trimethylchlorosilane or trimethylsilylacetamide may be reacted with the silicone tackifying resin, a catalyst not being necessary in this case.

MQD silicone tackifying resins are terpolymers having $R'_3SiO_{1/2}$ units ("M" units), $SiO_{4/2}$ units ("Q" units), and $R'_2SiO_{2/2}$ units ("D" units) such as are taught in U.S. Pat. No. 2,736,721 (Dexter). In MQD silicone tackifying resins, some of the methyl groups of the $R'_2SiO_{2/2}$ units ("D" units) can be replaced with vinyl ($CH_2$=CH—) groups ("$D^{Vi}$" units).

MQT silicone tackifying resins are terpolymers having $R'_3SiO_{1/2}$ units, $SiO_{4/2}$ units and $R'SiO_{3/2}$ units ("T" units) such as are taught in U.S. Pat. No. 5,110,890 (Butler), and Japanese Kokai HE 2-36234.

Suitable silicone tackifying resins are commercially available from sources such as Dow Corning, Midland, Mich., General Electric Silicones Waterford, N.Y. and Rhodia Silicones, Rock Hill, S.C. Examples of particularly useful MQ silicone tackifying resins include those available under the trade designations SR-545 and SR-1000, both of which are commercially available from GE Silicones, Waterford, N.Y. Such resins are generally supplied in organic solvent and may be employed in the adhesives of the present invention as received. Also useful in polydiorganosiloxane polyurea copolymers of the present invention are blends of two or more silicone resins.

The amount of a silicone tackifying resin (includes MQ resin, MQT, and MQD) needed will determine the desired levels of release and peel forces of the priming compositions. Preferably, for primers a wide range of silicone tackifying resin can be used, including 0 up to about 60 weight parts. Preferably, for self-priming pressure sensitive adhesives, at least about 30 weight parts, and more preferably, at least about 40 weight parts, is used to achieve the desired balance of release force, peel, and shear performance, when the total weight parts (i.e., parts by weight) of tackifying resin plus polydiorganosiloxane polyurea copolymers equals 100 parts (thus, these weight parts are in percentages). Preferably, no greater than about 70 weight parts, and more preferably, no greater than about 65 weight parts tackifying resin, is used to achieve the desired balance of release force, peel, and shear performance, when the total weight parts (i.e., parts by weight) of tackifying resin plus polydiorganosiloxane polyurea copolymers equals 100 parts (thus, these weight parts are in percentages based on the weight of the silicone tackifying resin and the polydiorganosiloxane polyurea copolymer).

Useful silicone tackifying resins include a relatively high M/Q ratio and low silanol content resins. Preferably, the silicone tackifying resins contain less than about 1.5% by weight (wt-%) silanol (Si—OH) content (i.e., hydroxyl content as silanol), based on the total weight of the silicone tackifying resin. Preferably, the silicone tackifying resins have an M/Q ratio of at least about 0.7:1.0.

Other Optional Additives

The adhesive composition may include other additives to adjust for desired properties. For example, dyes or pigments may be added as colorant; electrically and/or thermally conductive compounds may be added to make an adhesive electrically and/or thermally conductive or antistatic; antioxidants and bacteriostatic agents may be added; and UV light stabilizers and absorbers, such as hindered amine light stabilizers (HALS), may be added to stabilize the PSA against UV degradation and to block certain UV wavelengths from passing through the article. Other additives include adhesion promoters, fillers, tack enhancers, plasticizers, glass or ceramic microbubbles, expanded and unexpanded polymeric microspheres, blowing agents, polymers, and other property modifiers, such as clays, flame retardants, and compatibilizers. These additives can be used in various combinations in amounts of about 0.05 weight percent (wt-%) to about 25 weight percent, based on the total weight of the polydiorganosiloxane polyurea composition.

Preparation and Use of Articles

The priming compositions can be used as stand-alone primers, self-priming adhesives (preferably, pressure sensitive adhesives), and coatings (e.g., paints, etc.). They can be applied to appropriate substrates, e.g., backings, by a wide range of processes, including, solution coating, solution spraying, hot melt coating, extrusion, coextrusion, lamination, pattern coating, etc., to make laminates. The backing can be a release liner if desired, thereby forming a transfer tape.

When used as a primer, the priming composition can be coated onto a wide variety of substrates. These substrates can include backings and surfaces including adhesive-coated surfaces and laminates.

Suitable backings for use in adhesive articles of the present invention can include a wide range of substrate materials, examples being polymer films or foam cores, such as polyimide, polyethylene, polyethylene terephthalate (PET), biaxially oriented polypropylene (BOPP), and metallocene-polymerized poly(alpha-olefin) copolymers, cloth, paper, treated paper, woven and nonwoven scrims, netting, mesh, and the like. Examples of preferred film backings include poly(ethylene/acrylic acid), poly(ethylene/methacrylic acid), poly(ethylene/vinyl acetate) such as those available under the trade designation BYNELL from DuPont. Examples of preferred foam core backings include acrylic foams, polyurethane foams, poly(ethylene/vinyl acetate) foams, and the like.

The adhesive articles of the invention may be exposed to post processing steps such as die cutting, heating to cause expansion of the article, e.g., foam-in-place, and the like.

Objects and advantages of this invention are further illustrated by the following examples, but the particular materials and amounts thereof recited in these examples, as well as other conditions and details, should not be construed to unduly limit this invention. All amounts listed in the tape preparations and examples are by weight unless otherwise specified.

EXAMPLES

These examples are merely for illustrative purposes only and are not meant to be limiting on the scope of the appended claims. All parts, percentages, ratios, etc. in the examples and the rest of the specification are by weight unless indicated otherwise.

Table of Abbreviations

| Trade Designation or Other Abbreviation | Description |
|---|---|
| CLOISITE 20A | Clay commercially available from Southern Clay Products, Gonzales, TX |
| DYTEK A | 2-Methyl-1,5-diaminopentane commercially available from DuPont, Wilmington, DE |
| DESMODUR W H12MDI (also referred to as H-MDI) | Methylenedicyclohexylene-4,4'-diisocyanate commercially available from Bayer, Pittsburgh, PA |
| Fluorosilicone Liner | Fluorosilicone release liner 10256 commercially available from Rexam Release, Bedford Park, IL |
| PDMS diamine 33,000 | An approximately 33,000 molecular weight polydimethylsiloxane diamine prepared as described in Example 2 of U.S. Pat. No. 5,461,134 |
| PDMS diamine 900 | An approximately 900 molecular weight polydimethylsiloxane diamine prepared according to the method of Example 2 of U.S. Pat. No. 5,461,134 |
| PDMS diamine 1,622 | An approximately 1,622 molecular weight polydimethylsiloxane diamine prepared according to the method of Example 2 of U.S. Pat. No. 5,461,134 |
| PDMS diamine 2,924 | An approximately 2,924 molecular weight polydimethylsiloxane diamine prepared according to the method of Example 2 of U.S. Pat. No. 5,461,134 |
| PDMS diamine 4,000 | An approximately 4,000 number average molecular weight polydimethylsiloxane diamine prepared according to the method of Example 2 of U.S. Pat. No. 5,461,134 |
| PDMS diamine 5,300 | An approximately 5,300 number average molecular weight polydimethylsiloxane diamine prepared as described in Example 2 of U.S. Pat. No. 5,461,134 |
| PDMS diamine 12,000 | An approximately 12,000 number average molecular weight polydimethylsiloxane diamine prepared as described in Example 2 of U.S. Pat. No. 5,461,134 |
| PDMS diamine 14,400 | An approximately 14,400 number average molecular weight polydimethylsiloxane diamine prepared as described in Example 2 of U.S. Pat. No. 5,461,134 |
| PDMS diamine 24,000 | An approximately 24,000 number average molecular weight polydimethylsiloxane diamine prepared as described in Example 2 of U.S. Pat. No. 5,461,134 |
| SR-545 | A 60% solids solution of MQ resin in toluene commercially available from GE Silicones, Waterford, NY under the trade designation SR-545 |

-continued

Table of Abbreviations

| Trade Designation or Other Abbreviation | Description |
|---|---|
| TADA | Tertiary amine containing diamine, 3,3'-diamino-N-methyldipropylamine commercially available from Aldrich Chemical, Milwaukee, WI |
| TINUVIN 328 | UV absorber commercially available from Ciba Specialty Chemicals, Tarrytown, NY |
| TINUVIN 292 | Hindered amine light stabilizer commercially available from Ciba Specialty Chemicals, Tarrytown, NY |
| IRGANOX 1076 | Antioxidant commercially available from Ciba Specialty Chemicals, Tarrytown, NY |
| Acrylic Foam Core 1 | Acrylic foam core prepared as described in Example 5 of U.S. patent application Ser. No. 10/027,587, filed on Dec, 18, 2001, without the carbon black pigment |
| Acrylic Foam Core 2 | Acrylic foam core prepared as described in Example 5 of U.S. patent application Ser. No. 10/027,587, filed on Dec. 18, 2001 |
| Aluminum Foil | Aluminum foil backing (0.05 mm thick) commercially available from A. J. Oster Foils, Inc., Alliance, OH |
| PET | Aminated-polybutadiene primed film of polyethylene terephthalate having a thickness of 38 micrometers |
| PP | Polypropylene substrate |
| HDPE | High density polyethylene substrate |
| MQ Resin 1 | MQ silicone resin consisting of M, Q, and $T^{OH}$ structural units, having an M/Q ratio of 1.2, SiOH content of 0.7%, Mn = 2730, and Mw = 4410, 62.4% solids by weight in xylene referred to as "MQ Resin F" in U.S. patent application Ser. No. 10/027,587, filed on Dec. 18, 2001, and characterized according to the methods described therein |
| Mineral Oil | Mineral Oil commercially available from Paddock Laboratories, Minneapolis, MN |
| Piperazine Diamine | 1,4-Bis(3-aminopropyl)piperazine commercially available from Aldrich Chemical, Milwaukee, WI |

Test Methods

180° Peel Adhesion

This peel adhesion test is similar to the test method described in ASTM D 3330-90, substituting a glass substrate or a polypropylene (PP) substrate for the stainless steel substrate described in the test.

Adhesive coatings on PET film were cut into 1.27 centimeter by 15 centimeter strips. Each strip was then adhered to a 10 centimeter by 20 centimeter clean, solvent washed glass coupon or HDPE panel using a 2-kilogram roller passed once over the strip. The bonded assemblies dwelled at room temperature for the time specified in the tables and were tested for 180° peel adhesion using an IMASS slip/peel tester (Model 3M90, commercially available from Instrumentors Inc., Strongsville, Ohio) at a rate of 2.3 meters/minute (90 inches/minute) or 30.5 centimeters/minute (12 inches/minute) over a five second data collection time. Two samples were tested; the reported peel adhesion value is an average of the peel adhesion value from each of the two samples.

Failure mode was adhesive failure in which the failure was between the PSA layer and the substrate (either glass or PP) unless otherwise noted. Other failure modes are recorded as "Foam Split" which means that the foam core of the tape cohesively split; "PSA-Primer" which means that the failure occurred between the PSA layer and the primer layer; "Primer-Core" which means that the failure occurred between the primer layer and the foam core.

Room and Elevated Temperature Shear Strength

This shear strength test is similar to the test method described in ASTM D 3654-88.

Adhesive coatings on PET film were cut into 1.27 centimeter (0.5 inch) by 15 centimeter (6 inch) strips. Each strip was then adhered to a stainless steel panel such that a 1.27 centimeter (0.5 inch) by 2.54 centimeter (1 inch) portion of each strip was in firm contact with the panel and one end portion of the tape being free. The panel with coated strip attached was held in a rack such that the panel formed an angle of 178° with the extended tape free end which was tensioned by application of a force of 500 grams applied as a hanging weight from the free end of the coated strip. The 2° less than 180° was used to negate any peel forces, thus ensuring that only shear strength forces were measured, in an attempt to more accurately determine the holding power of the tape being tested. The time elapsed for each tape example to separate from the test panel was recorded as the shear strength. All shear strength failures (if the adhesive failed at less than 10,000 minutes) reported herein were cohesive failures of the adhesive. Each test was terminated at 10,000 minutes, unless the adhesive failed at an earlier time (as noted). For elevated temperature shear strength testing (70° C.) the panel with coated strip attached was placed in a 70° C. oven for 10 minutes with no load before the 500 grams hanging weight was attached.

90° Peel Adhesion of Acrylic Foam Tapes

Foam tapes bearing adhesive compositions of the invention were evaluated by measuring their peel adhesion to various surfaces. The foam tapes were prepared as described in the Examples.

A strip of foam tape measuring 1.25 cm wide×12.7 cm long was applied to a polypropylene (PP), high density polyethylene (HDPE), or stainless steel (SS) test panel, and a 0.13-mm thick anodized aluminum foil was laminated to the exposed adhesive layer. The aluminum foil was larger in size than the foam tape so that there was a portion of the aluminum foil that was not laminated to the adhesive layer. The assembly was then rolled down using two passes (one each direction) of a 6.8-kg steel roller at a rate of 30.5 cm/min and allowed to dwell for 72 hours at the temperature indicated in Table 7.

The foam tape was peeled from the test panel by pulling the aluminum strip at an angle of 90° in an Instron Model 4465 tensile tester (available from Instron Corporation, Canton, Mass.) at a crosshead rate of 30.5 cm/min.

The average force required to remove the foam tape from the panel was recorded in N/dm. The tests were performed after aging the adhesive on the liner (i.e., the transfer tape) one week at 70° C. followed by 1 day at room temperature (about 22° C.) prior to preparing the foam tape and applying the foam tape to test panel. The values reported were the average of two replicates.

Failure mode was recorded as either "Foam Split" which means that the foam core of the tape cohesively split or "Primer Failure" which means that the failure occurred between the PSA layer and the foam core.

Comparative Example C1

In a reaction vessel was placed 330 parts of PDMS diamine 33,000 1.86 parts of DYTEK A. A mixture of toluene/2-propanol (70/30 by weight) was added to make the solids content 20%. The solution was stirred at room temperature, 6.71 parts of H-MDI was added and the resulting mixture was stirred for two hours to give a PSA solution. The tackifier resin SR-545 was added to give a weight ratio of elastomer to SR-545 of 42:58. The resulting solution was solvent coated onto a fluorosilicone liner and dried for 10 minutes at 70° C. to give a PSA thickness of 51 micrometers. The resulting PSA coating was laminated onto one side of Acrylic Foam Core 1 and the other side was laminated to an aluminum foil backing to form a tape. These tapes were tested for elevated temperature shear strength after standing for various time periods under controlled temperature (20° C.) and humidity (50% relative humidity). These data are presented in Table 1.

Example 1

In a reaction vessel was placed 330 parts of PDMS diamine 33,000 and 1.16 parts of DYTEK A and 0.87 parts of TADA. A mixture of toluene/2-propanol (70/30 by weight) was added to make the solids content 20%. The solution was stirred at room temperature, 6.71 parts of H-MDI was added and the resulting mixture was stirred for two hours to give a PSA solution. The tackifier resin SR-545 was added to give a weight ratio of elastomer to SR-545 of 42:58. The resulting solution was solvent coated onto a fluorosilicone liner and dried for 10 minutes at 70° C. to give a PSA thickness of 51 micrometers. The resulting PSA coating was laminated onto one side of Acrylic Foam Core 1 and the other side was laminated to an aluminum foil backing to form a tape. These tapes were tested for elevated temperature shear strength after standing for various time periods under controlled temperature (20° C.)and humidity (50% relative humidity). These data are presented in Table 1.

Example 2

In a reaction vessel was placed 330 parts of PDMS diamine 33,000 and 0.70 parts of DYTEK A and 1.45 parts of TADA. A mixture of toluene/2-propanol (70/30 by weight) was added to make the solids content 20%. The solution was stirred at room temperature, 6.71 parts of H-MDI was added and the resulting mixture was stirred for two hours to give a PSA solution. The tackifier resin SR-545 was added to give a weight ratio of elastomer to SR-545 of 42:58. The resulting solution was solvent coated onto a fluorosilicone liner and dried for 10 minutes at 70° C. to give a PSA thickness of 51 micrometers. The resulting PSA coating was laminated onto one side of Acrylic Foam Core 1 and the other side was laminated to an aluminum foil backing to form a tape. These tapes were tested for elevated temperature shear strength after standing for various time periods under controlled temperature (20° C.) and humidity (50% relative humidity).

Example 3

In a reaction vessel was placed 330 parts of PDMS diamine 33,000 and 2.32 parts of TADA. A mixture of toluene/2-propanol (70/30 by weight) was added to make the solids content 20%. The solution was stirred at room temperature, 6.71 parts of H-MDI was added and the resulting mixture was stirred for two hours to give a PSA solution. The tackifier resin SR-545 was added to give a weight ratio of elastomer to SR-545 of 42:58. The resulting solution was solvent coated onto a fluorosilicone liner and dried for 10 minutes at 70° C. to give a PSA thickness of 51 micrometers. The resulting PSA coating was laminated onto one side of Acrylic Foam Core 1 and the other side was laminated to an aluminum foil backing to form a tape. These tapes were tested for elevated temperature shear strength after standing for various time periods under controlled temperature (20° C.)and humidity (50% relative humidity).

Comparative Example C2

In a reaction vessel was placed 330 parts of PDMS diamine 33,000 1.86 parts of DYTEK A. A mixture of toluene/2-propanol (70/30 by weight) was added to make the solids content 20%. The solution was stirred at room temperature, 6.71 parts of H-MDI was added and the resulting mixture was stirred for two hours to give a PSA solution. The tackifier resin SR-545 was added to give a weight ratio of elastomer to SR-545 of 42:58. The resulting solution was solvent coated onto a fluorosilicone liner and dried for 10 minutes at 70° C. to give a PSA thickness of 51 micrometers. The resulting PSA coating was laminated onto PET backing to form a tape. These tapes were tested 180° peel to glass and PP substrates after various dwell times. These data are presented in Table 2.

Example 4

In a reaction vessel was placed 330 parts of PDMS diamine 33,000 and 1.16 parts of DYTEK A and 0.87 parts of TADA. A mixture of toluene/2-propanol (70/30 by weight) was added to make the solids content 20%. The solution was stirred at room temperature, 6.71 parts of H-MDI was added and the resulting mixture was stirred for two hours to give a PSA solution. The tackifier resin SR-545 was added to give a weight ratio of elastomer to SR-545 of 42:58. The resulting solution was solvent coated onto a fluorosilicone liner and dried for 10 minutes at 70° C. to give a PSA thickness of 51 micrometers. The resulting PSA coating was laminated onto PET backing to form a tape. These tapes were tested 180° peel to glass and PP substrates after various dwell times. These data are presented in Table 2 and demonstrate that the incorporation of polar groups (e.g., electron rich tertiary amine groups) does not adversely affect adhesion to nonpolar substrates (e.g., polypropylene).

Example 5

In a reaction vessel was placed 330 parts of PDMS diamine 33,000 and 0.70 parts of DYTEK A and 1.45 parts of TADA. A mixture of toluene/2-propanol (70/30 by weight) was added to make the solids content 20%. The solution was stirred at room temperature, 6.71 parts of H-MDI was added and the resulting mixture was stirred for two hours to give a PSA solution. The tackifier resin SR-545 was added to give a weight ratio of elastomer to SR-545 of 42:58. The resulting solution was solvent coated onto a fluorosilicone liner and dried for 10 minutes at 70° C. to give a PSA thickness of 51 micrometers. The resulting PSA coating was laminated onto PET backing to form a tape. These tapes were tested 180° peel to glass and PP substrates after various dwell times. These data are presented in Table 2 and demonstrate that the incorporation of polar groups (e.g., electron rich tertiary amine groups) does not adversely affect adhesion to nonpolar substrates (e.g., polypropylene).

Example 6

In a reaction vessel was placed 330 parts of PDMS diamine 33,000 and 2.32 parts of TADA. A mixture of toluene/2-propanol (70/30 by weight) was added to make the solids content 20%. The solution was stirred at room temperature, 6.71 parts of H-MDI was added and the resulting mixture was stirred for two hours to give a PSA solution. The tackifier resin SR-545 was added to give a weight ratio of elastomer to SR-545 of 42:58. The resulting solution was solvent coated onto a fluorosilicone liner and dried for 10 minutes at 70° C. to give a PSA thickness of 51 micrometers. The resulting PSA coating was laminated onto PET backing to form a tape. These tapes were tested 180° peel to glass and PP substrates after various dwell times. These data are presented in Table 2 and demonstrate that the incorporation of polar groups (e.g., electron rich tertiary amine groups) does not adversely affect adhesion to nonpolar substrates (e.g., polypropylene).

Example 7

In a reaction vessel was placed 330 parts of PDMS diamine 33,000 and 1.45 parts of TADA. A mixture of toluene/2-propanol (70/30 by weight) was added to make the solids content 20%. The solution was stirred at room temperature, 5.16 parts of H-MDI was added and the resulting mixture was stirred for two hours to give a PSA solution. The tackifier resin SR-545 was added to give a weight ratio of elastomer to SR-545 of 42:58. The resulting solution was solvent coated onto a fluorosilicone liner and dried for 10 minutes at 70° C. to give a PSA thickness of 51 micrometers. The resulting PSA coating was laminated onto PET backing to form a tape. These tapes were tested 180° peel to glass and PP substrates after various dwell times. These data are presented in Table 2 and demonstrate that the incorporation of polar groups (e.g., electron rich tertiary amine groups) does not adversely affect adhesion to nonpolar substrates (e.g., polypropylene).

Comparative Example C3

In a reaction vessel was placed 330 parts of PDMS diamine 33,000 1.86 parts of DYTEK A. A mixture of toluene/2-propanol (70/30 by weight) was added to make the solids content 20%. The solution was stirred at room temperature, 6.71 parts of H-MDI was added and the resulting mixture was stirred for two hours to give a PSA solution. The tackifier resin SR-545 was added to give a weight ratio of elastomer to SR-545 of 42:58. The resulting solution was solvent coated onto a fluorosilicone liner and dried for 10 minutes at 70° C. to give a PSA thickness of 51 micrometers. The resulting PSA coating was laminated onto Acrylic Foam Core 2 to form a tape. These tapes were tested 180° peel to PP substrates after a 3 day dwell time. These data are presented in Table 3.

Example 8

In a reaction vessel was placed 330 parts of PDMS diamine 33,000 and 1.16 parts of DYTEK A and 0.87 parts of TADA. A mixture of toluene/2-propanol (70/30 by weight) was added to make the solids content 20%. The solution was stirred at room temperature, 6.71 parts of H-MDI was added and the resulting mixture was stirred for two hours to give a PSA solution. The tackifier resin SR-545 was added to give a weight ratio of elastomer to SR-545 of 42:58. The resulting solution was solvent coated onto a fluorosilicone liner and dried for 10 minutes at 70° C. to give a PSA thickness of 51 micrometers. The resulting PSA coating was laminated onto Acrylic Foam Core 2 to form a tape. These tapes were tested 180° peel to PP substrates after a 3 day dwell time. These data are presented in Table 3, which demonstrate that the incorporation of polar groups (e.g., electron rich tertiary amine groups) does not adversely affect peel values from nonpolar substrates (e.g., polypropylene).

Example 9

In a reaction vessel was placed 330 parts of PDMS diamine 33,000 and 0.70 parts of DYTEK A and 1.45 parts of TADA. A mixture of toluene/2-propanol (70/30 by weight) was added to make the solids content 20%. The solution was stirred at room temperature, 6.71 parts of H-MDI was added and the resulting mixture was stirred for two hours to give a PSA solution. The tackifier resin SR-545 was added to give a weight ratio of elastomer to SR-545 of 42:58. The resulting solution was solvent coated onto a fluorosilicone liner and dried for 10 minutes at 70° C. to give a PSA thickness of 51 micrometers. The resulting PSA coating was laminated onto Acrylic Foam Core 2 to form a tape. These tapes were tested 180° peel to PP substrates after a 3 day dwell time. These data are presented in Table 3, which demonstrate that the incorporation of polar groups (e.g., electron rich tertiary amine groups) does not adversely affect peel values from nonpolar substrates (e.g., polypropylene).

Example 10

In a reaction vessel was placed 330 parts of PDMS diamine 33,000 and 2.32 parts of TADA. A mixture of toluene/2-propanol (70/30 by weight) was added to make the solids content 20%. The solution was stirred at room temperature, 6.71 parts of H-MDI was added and the resulting mixture was stirred for two hours to give a PSA solution. The tackifier resin SR-545 was added to give a weight ratio of elastomer to SR-545 of 42:58. The resulting solution was solvent coated onto a fluorosilicone liner and dried for 10 minutes at 70° C. to give a PSA thickness of 51 micrometers. The resulting PSA coating was laminated onto Acrylic Foam Core 2 to form a tape. These tapes were tested 180° peel to PP substrates after a 3 day dwell time. These data are presented in Table 3, which demonstrate that the incorporation of polar groups (e.g., electron rich tertiary amine groups) does not adversely affect peel values from nonpolar substrates (e.g., polypropylene).

Example 11

In a reaction vessel was placed 330 parts of PDMS diamine 33,000 and 1.45 parts of TADA. A mixture of toluene/2-propanol (70/30 by weight) was added to make the solids content 20%. The solution was stirred at room temperature, 5.16 parts of H-MDI was added and the resulting mixture was stirred for two hours to give a PSA solution. The tackifier resin SR-545 was added to give a weight ratio of elastomer to SR-545 of 42:58. The resulting solution was solvent coated onto a fluorosilicone liner and dried for 10 minutes at 70° C. to give a PSA thickness of 51 micrometers. The resulting PSA coating was laminated onto Acrylic Foam Core 2 to form a thick adhesive layer which was laminated onto PET backing to form a tape. These tapes were tested 180° peel to glass and PP substrates after various dwell times. These data are presented in Table 3, which demonstrate that the incorporation of polar groups (e.g., electron rich tertiary amine groups) does not adversely affect peel values from nonpolar substrates (e.g., polypropylene).

Examples 12–18

A series of tertiary amine containing SPU elastomers were made by reacting different molecular weight PDMS diamines, TADA and H-MDI according to the amounts shown in Table 4 with the same mixture of solvents as Example 11. A 50 micrometer thick layer of the elastomer solution was coated on top of PSA from Comparative Example 1 and dried at 70° C. for 10 minutes to give a dried primer layer of 8 to 10 micrometers. The resulting PSA coating was laminated onto one side of Acrylic Foam Core 1 and the other side was laminated to an aluminum foil backing to form a tape. These tapes were tested for 180° peel to glass substrates after a 3 day dwell time. These data are presented in Table 5.

Example 19

A silicone polyurea elastomer was prepared by charging 110 parts PDMS diamine 14,400, 2.77 parts TADA, 335 parts toluene, and 153 parts 2-propanol to a reaction vessel and mixing well at room temperature (about 22° C.). Twelve (12.0) parts H-MDI was added and the reactants agitated for two hours. An additional 2.77 parts TADA was added and allowed to agitate an additional 16 hours to complete the synthesis of the silicone elastomer polyurea in solution.

Separately, a clay solution was made by dispersing 5 parts CLOISITE 20A into a solution of 80.75 parts toluene and 14.25 parts 2-propanol under moderate shear at room temperature (about 22° C.).

A sample (425 parts) of silicone polyurea elastomer solution prepared above and 300 parts clay solution were mixed together and agitated for 16 hours to provide a homogeneous solution. To this solution was added 1.0 part TINUVIN 328, 1.0 part TINUVIN 292, and 0.25 part IRGANOX 1076 to provide primer.

A pressure sensitive adhesive solution and an acrylic foam tape construction were prepared as in Example 7 of U.S. patent application Ser. No. 10/027,587, filed on 18 Dec. 2001, with the above-described primer. The construction was tested as described therein.

Comparative Examples C4–C7

In a reaction vessel was placed PDMS diamine 33,000 DYTEK A in the mole ratios shown in Table 6. A mixture of toluene/2-propanol (70/30 by weight) was added to make the solids content 20%. The solution was stirred at room temperature, H-MDI was added in the mole ratio shown in Table 6 and the resulting mixture was stirred for two hours to give a elastomer solution. The tackifier resin MQ Resin 1 was added to give a weight ratio of elastomer to MQ Resin 1of 39:61. Additionally 1.5 parts per one hundred parts of elastomer and tackifier resin of Mineral Oil were added. The resulting solution was solvent coated onto a fluorosilicone liner and dried for 10 minutes at 70° C. to give a PSA thickness of 51 micrometers. The resulting PSA coating was laminated onto Acrylic Foam Core 2 to form a tape. These tapes were tested for 90° peel to PP, HDPE, and stainless steel substrates according to the dwell conditions shown in Table 7.

Examples 20–23

In a reaction vessel was placed PDMS diamine 33,000 and Piperazine Diamine in the mole ratios shown in Table 6. A mixture of toluene/2-propanol (70/30 by weight) was added to make the solids content 20%. The solution was stirred at room temperature, H-MDI was added in the mole ratio shown in Table 6 and the resulting mixture was stirred for two hours to give a elastomer solution. The tackifier resin MQ Resin 1 was added to give a weight ratio of elastomer to MQ Resin 1 of 39:61. Additionally 1.5 parts per one hundred parts of elastomer and tackifier resin of Mineral Oil were added. The resulting solution was solvent coated onto a fluorosilicone liner and dried for 10 minutes at 70° C. to give a PSA thickness of 51 micrometers. The resulting PSA coating was laminated onto Acrylic Foam Core 2 to form a tape. These tapes were tested for 90° peel to PP, HDPE, and stainless steel substrates according to the dwell conditions shown in Table 7.

TABLE 1

| Example | TADA amount (weight %) | 70° C. Shear 2 hours after lamination (mins) | 70° C. Shear 2 days after lamination (mins) | 70° C. Shear 4 days after lamination (mins) | 70° C. Shear 7 days after lamination (mins) | 70° C. Shear 14 days after lamination (mins) |
|---|---|---|---|---|---|---|
| C1 | 0 | * | 169 | 172 | 154 | 218 |
| 1 | 0.26 | * | 771 | 763 | 872 | 1052 |
| 2 | 0.43 | 10,000 | 10,000 | 10,000 | 10,000 | 10,000 |
| 3 | 0.68 | 10,000 | 10,000 | 10,000 | 10,000 | 10,000 |

*Test was not run on this sample.

TABLE 2

| Example | TADA amount (weight %) | 180° Peel to glass 1 minute dwell 30.5 cm/min (N/dm) | 180° Peel to glass 1 minute dwell 2.3 cm/min (N/dm) | 180° Peel to PP 1 minute dwell 30.5 cm/min (N/dm) | 180° Peel to PP 1 minute dwell 2.3 cm/min (N/dm) | 180° Peel to PP 24 hour dwell 30.5 cm/min (N/dm) | 180° Peel to PP 24 hour dwell 2.3 cm/min (N/dm) |
|---|---|---|---|---|---|---|---|
| C2 | 0 | 64.3 | 74.2 | 58.9 | 61.3 | 58.4 | 63.7 |
| 4 | 0.26 | 56.7 | 92.3 | 44.6 | * | 52.3 | 59.3 |
| 5 | 0.43 | 71.5 | 80.7 | 45.7 | 60.0 | 46.8 | 58.9 |
| 6 | 0.68 | 68.0 | 92.1 | 57.5 | 67.8 | 48.1 | 68.9 |
| 7 | 0.43 | 63.2 | 73.5 | 45.7 | 49.0 | 55.8 | 71.5 |

Test was not run on this sample.

TABLE 3

| Example | TADA amount (weight %) | 180° Peel to PP 24 hour dwell 30.5 cm/min (N/dm) | 180° Peel to PP Failure Mode |
|---|---|---|---|
| C3 | 0 | 480 | Foam Split |
| 8 | 0.26 | 499 | Foam Split |
| 9 | 0.43 | 497 | Foam Split |
| 10 | 0.68 | 497 | Foam Split |
| 11 | 0.43 | 492 | Foam Split |

TABLE 4

| Example | Mw of PDMS diamine | PDMS diamine (parts by weight) | TADA (parts by weight) | H-MDI (parts by weight) |
|---|---|---|---|---|
| 12 | 900 | 66.82 | 5.00 | 28.18 |
| 13 | 1,622 | 74.20 | 5.00 | 20.80 |
| 14 | 2,924 | 79.06 | 5.00 | 15.94 |
| 15 | 4,000 | 80.83 | 5.00 | 14.17 |
| 16 | 5,300 | 82.06 | 5.00 | 12.94 |
| 17 | 12,000 | 84.25 | 5.00 | 10.75 |
| 18 | 24,000 | 85.15 | 5.00 | 9.85 |
| 19 | 14,400 | 110 | 5.54 | 12.0 |

TABLE 5

| Example | MW of PDMS diamine | 180° Peel to glass 3 day dwell, 30.5 cm/min (N/dm) | 180° Peel to glass Failure Mode |
|---|---|---|---|
| 12 | 900 | 28.0 | PSA-Primer |
| 13 | 1,622 | 312 | PSA-Primer |
| 14 | 2,924 | 511 | Foam Split |
| 15 | 4,000 | 522 | Foam Split |
| 16 | 5,300 | 529 | Foam Split |
| 17 | 12,000 | 478 | Foam Split |
| 18 | 24,000 | 175 | Primer-Core |

TABLE 6

| Example | Moles of PDMS diamine 33,000 | Moles of DYTEK A | Moles of Piperazine Diamine | Moles of H-MDI |
|---|---|---|---|---|
| C4 | 1 | 1 | 0 | 2 |
| C5 | 1 | 1.5 | 0 | 2.5 |
| C6 | 1 | 2 | 0 | 3 |
| C7 | 1 | 3 | 0 | 4 |
| 20 | 1 | 0 | 1 | 2 |
| 21 | 1 | 0 | 1.5 | 2.5 |
| 22 | 1 | 0 | 2 | 3 |
| 23 | 1 | 0 | 3 | 4 |

TABLE 7

| Example | 90° Peel from PP after 3 days at room temp (N/dm)/ Failure Mode | 90° Peel from PP after 3 days at 70° C. (N/dm)/ Failure Mode | 90° Peel from PP after 3 days at 90° C. (N/dm)/ Failure Mode | 90° Peel from HPDE after 3 days at room temp (N/dm)/ Failure Mode | 90° Peel from Stainless steel after 3 days at room temp (N/dm)/ Failure Mode |
|---|---|---|---|---|---|
| C4 | 126.0/PF | 124.1/PF | 0.0/PF | 136.5/PF | 122.5/PF |
| C5 | 152.3/PF | 143.5/PF | 92.8/PF | 150.5/PF | 152.3/PF |
| C6 | 157.5/PF | 162.8/PF | 38.5/PF | 159.3/PF | 145.3/PF |
| C7 | 175.0/PF | 176.8/PF | 138.3/PF | 173.3/PF | 173.3/PF |
| 20 | 505.9/PF | 439.4/PF | 339.6/PF | 474.4/PF | 462.1/PF |
| 21 | 509.4/FS | 567.1/FS | 451.6/PF | 505.9/FS | 507.6/FS |
| 22 | 509.4/FS | 567.1/FS | 572.4/FS | 504.1/FS | 509.4/FS |
| 23 | 507.6/FS | 556.6/FS | 563.6/FS | 406.1/FS | 488.4/FS |

PF = Primer Failure  FS = Foam Split

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. An article comprising a backing, a pressure sensitive adhesive disposed on at least one major surface thereof, and a primer disposed on the pressure sensitive adhesive, wherein the primer comprises a polydiorganosiloxane polyurea copolymer comprising electron rich groups.

2. The article of claim 1, wherein the backing is a release liner.

3. The article of claim 1, wherein the polydiorganosiloxane comprises tertiary amino groups that are all in a form of a Lewis base, pyridine groups that are all in a form of a Lewis base, or combinations thereof.

4. The article of claim 1, wherein the primer further comprises a silicone tackifying resin.

5. The article of claim 1, wherein the primer is an adhesive.

6. The article of claim 1, wherein the polydiorganosiloxane polyurea copolymer comprises the following repeating unit:

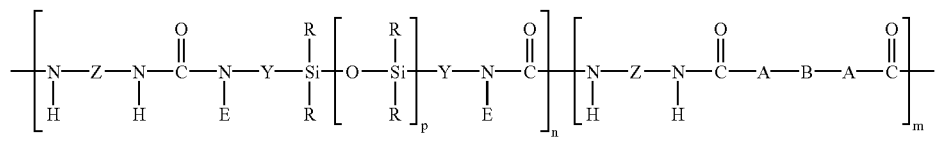

wherein
  each R is independently an alkyl moiety, a vinyl moiety or higher alkenyl moiety, a cycloalkyl moiety, an aryl moiety, or a fluorine-containing group;
  each Z is independently a polyvalent moiety that is an arylene moiety, an aralkylene moiety, an alkylene moiety, or a cycloalkylene moiety;
  each Y is independently a polyvalent moiety that independently is an alkylene moiety, an aralkylene moiety or an arylene moiety;
  each E is independently hydrogen, an alkyl moiety of 1 to 10 carbon atoms, phenyl, or a moiety that completes a ring structure including Y to form a heterocycle;
  each A is independently oxygen or —N(G)-, wherein each G is independently hydrogen, an alkyl moiety of 1 to 10 carbon atoms, phenyl, or a moiety that completes a ring structure including B to form a heterocycle;
  B is an alkylene, aralkylene, cycloalkylene, phenylene, polyalkylene, polyalkylene oxide, copolymers, or mixtures thereof, or a moiety completing a ring structure including A to form a heterocycle; with the proviso that at least one B group includes an electron rich group;
  m is a number that is 1 to about 1000;
  n is a number that is equal to or greater than 1; and
  p is a number that is about 5 or larger.

7. An adhesive article comprising:
a foam backing comprising acid functional groups; and
a pressure sensitive adhesive disposed on at least one major surface of the backing, the pressure sensitive adhesive comprising
(a) a polydiorganosiloxane polyurea copolymer comprising tertiary amine groups that are all in a form of a Lewis base, pyridine groups that are all in a form of a Lewis base, or combinations thereof; and
(b) a silicone tackifying resin.

8. The adhesive article of claim 7 wherein the polydiorganosiloxane polyurea copolymer comprises the following repeating unit:

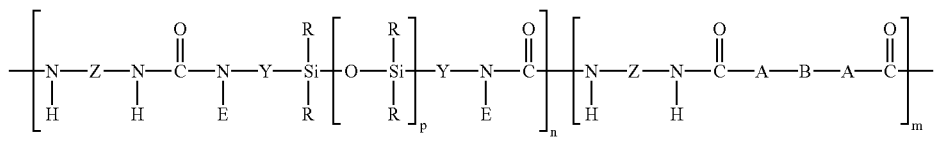

wherein
each R is independently an alkyl moiety, a vinyl moiety or higher alkenyl moiety, a cycloalkyl moiety, an aryl moiety, or a fluorine-containing group;
each Z is independently a polyvalent moiety that is an arylene moiety, an aralkylene moiety, an alkylene moiety, or a cycloalkylene moiety;
each Y is independently a polyvalent moiety that independently is an alkylene moiety, an aralkylene moiety or an arylene moiety;
each E is independently hydrogen, an alkyl moiety of 1 to 10 carbon atoms, phenyl, or a moiety that completes a ring structure including Y to form a heterocycle;
each A is independently oxygen or —N(G)-, wherein each G is independently hydrogen, an alkyl moiety of 1 to 10 carbon atoms, phenyl, or a moiety that completes a ring structure including B to form a heterocycle;
B is an alkylene, aralkylene, cycloalkylene, phenylene, polyalkylene, polyalkylene oxide, copolymers, or mixtures thereof, or a moiety completing a ring structure including A to form a heterocycle; with the proviso that at least one B group includes an electron rich group;
m is a number that is 1 to about 1000;
n is a number that is equal to or greater than 1; and
p is a number that is about 5 or larger.

9. The adhesive article of claim 7 wherein the backing comprises poly(ethylene/acrylic acid), poly(ethylene/methacrylic acid), or poly(ethylene/vinyl acetate).

10. The adhesive article of claim 8 wherein m is a number that is 1 to about 25, n is a number that is greater than 8, and p is a number that is about 40 to about 1500.

11. The adhesive article of claim 7 wherein the backing comprises carboxylic acid groups, phosphoric acid groups, or sulfuric acid groups.

12. The adhesive article of claim 7 wherein the polydiorganosiloxane polyurea copolymer has tertiary amine groups selected from aliphatic or cycloaliphatic amine groups.

13. A primed surface comprising:
a foam having a surface comprising acid functional groups; and
a primer comprising a polydiorganosiloxane polyurea copolymer comprising tertiary amine groups that are all in a form of a Lewis base, pyridine groups that are all in a form of a Lewis base, or combinations thereof.

14. The primed surface of claim 13 wherein the polydiorganosiloxane polyurea copolymer comprises the following repeating unit:

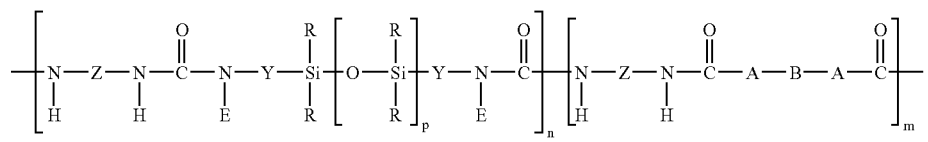

wherein
each R is independently an alkyl moiety, a vinyl moiety or higher alkenyl moiety, a cycloalkyl moiety, an aryl moiety, or a fluorine-containing group;
each Z is independently a polyvalent moiety that is an arylene moiety, an aralkylene moiety, an alkylene moiety, or a cycloalkylene moiety;
each Y is independently a polyvalent moiety that independently is an alkylene moiety, an aralkylene moiety or an arylene moiety;
each E is independently hydrogen, an alkyl moiety of 1 to 10 carbon atoms, phenyl, or a moiety that completes a ring structure including Y to form a heterocycle;
each A is independently oxygen or —N(G)-, wherein each G is independently hydrogen, an alkyl moiety of 1 to 10 carbon atoms, phenyl, or a moiety that completes a ring structure including B to form a heterocycle;
B is an alkylene, aralkylene, cycloalkylene, phenylene, polyalkylene, polyalkylene oxide, copolymers, or mixtures thereof or a moiety completing a ring structure including A to form a heterocycle; with the proviso that at least one B group includes an electron rich group;
m is a number that is 1 to about 1000;

n is a number that is equal to or greater than 1; and p is a number that is about 5 or larger.

15. The primed surface of claim 13 wherein the primer composition further comprises a tackifying resin.

16. The primed surface of claim 13 wherein the acid groups comprise carboxylic acid groups, phosphoric acid groups, or sulfuric acid groups.

17. The primed surface of claim 13 wherein the polydiorganosiloxane polyurea copolymer has tertiary amine groups selected from aliphatic or cycloaliphatic amine groups.

18. The primed surface of claim 13 wherein in the surface comprises poly(ethylene/acrylic acid), poly(ethylene/methacrylic acid), or poly(ethylene/vinyl acetate).

19. An adhesive article comprising:
 a backing comprising acid functional groups selected from carboxylic acid groups, phosphoric acid groups, or sulfuric acid groups, wherein the backing having carboxylic acid groups comprises poly(ethylene/acrylic acid), poly(ethylene/methacrylic acid), or poly(ethylene/vinyl acetate); and
 a pressure sensitive adhesive disposed on at least one major surface of the backing, the pressure sensitive adhesive comprising
  (a) a polydiorganosiloxane polyurea copolymer comprising tertiary amine groups that are all in a form of a Lewis base, pyridine groups that are all in a form of a Lewis base, or combinations thereof; and
  (b) a silicone tackifying resin.

20. The adhesive article of claim 19 wherein the backing comprises a film backing or foam core backing.

21. A primed surface comprising:
 a surface comprising acid functional groups selected from carboxylic acid groups, phosphoric acid groups, or sulfuric acid groups, wherein the surface having carboxylic acid groups comprises poly(ethylene/acrylic acid), poly(ethylene/methacrylic acid), or poly(ethylene/vinyl acetate); and
 a primer comprising a polydiorganosiloxane polyurea copolymer comprising tertiary amine groups that are all in a form of a Lewis base, pyridine groups that are all in a form of a Lewis base, or combinations thereof.

22. The primed surface of claim 21 wherein the surface is a major surface of a film backing or a foam core backing.

* * * * *

UNITED STATES PATENT AND TRADEMARK OFFICE
CERTIFICATE OF CORRECTION

PATENT NO. : 7,090,922 B2
APPLICATION NO. : 10/025130
DATED : August 15, 2006
INVENTOR(S) : Zhiming Zhou It is certified that error appears in the above-identified patent and that said Letters Patent is hereby corrected as shown below:

Column 8 – Line 48 - Delete "(R'$_3$SiO/$_{1/2}$" and insert -- (R'$_3$SiO$_{1/2}$ --, therefor.

Column 20 – Line 6 (Approx.) - Before "(parts" delete "diamine".

Column 21-22 (Table 7) – Col. 2 – Line 3 – After "temp" insert -- . --.

Column 21-22 (Table 7) – Col. 5 – Line 4 – After "temp" insert -- . --.

Column 21-22 (Table 7) – Col. 6 – Line 4 – After "temp" insert -- . --.

Column 24 – Line 64 – In Claim 14, after "thereof" insert -- . --.

Signed and Sealed this

Twentieth Day of March, 2007

JON W. DUDAS
*Director of the United States Patent and Trademark Office*